United States Patent
Park et al.

(10) Patent No.: US 6,904,281 B2
(45) Date of Patent: Jun. 7, 2005

(54) METHOD FOR DISCRIMINATING NETWORK DOMAIN AND INTERWORKING WITH THE SAME IN IMT-2000 SYSTEM

(75) Inventors: Jae-Hong Park, Seoul (KR); Jeong-Hwa Ye, Seoul (KR)

(73) Assignee: UTStarcom, Inc., Alameda, CA (US)

( * ) Notice: Subject to any disclaimer, the term of this patent is extended or adjusted under 35 U.S.C. 154(b) by 646 days.

(21) Appl. No.: 09/861,360

(22) Filed: May 18, 2001

(65) Prior Publication Data

US 2001/0049285 A1 Dec. 6, 2001

(30) Foreign Application Priority Data

Jun. 3, 2000 (KR) ........................................ 2000-30627

(51) Int. Cl.[7] ................................................ H04Q 7/20
(52) U.S. Cl. ................. 455/432.1; 455/432.2; 455/552.1; 455/553.1; 370/503; 370/310
(58) Field of Search .................... 455/432.1, 432.2, 455/552.1, 553.1; 370/503, 310; 375/355

(56) References Cited

U.S. PATENT DOCUMENTS

| | | | |
|---|---|---|---|
| 6,031,467 A | 2/2000 | Hymel et al. .......... | 340/825.44 |
| 6,104,709 A | 8/2000 | Rinchiuso et al. .......... | 370/335 |
| 6,144,651 A | 11/2000 | Rinchiuso et al. .......... | 370/335 |
| 6,157,814 A | 12/2000 | Hymel et al. ............... | 455/31.1 |
| 6,377,640 B2 * | 4/2002 | Trans ......................... | 375/354 |
| 6,542,734 B1 * | 4/2003 | Abrol et al. .............. | 455/412.1 |
| 6,594,246 B1 * | 7/2003 | Jorgensen .................... | 370/338 |
| 6,714,515 B1 * | 3/2004 | Marchand .................... | 370/231 |
| 6,714,987 B1 * | 3/2004 | Amin et al. ................. | 709/249 |
| 2001/0036834 A1 * | 11/2001 | Das et al. .................... | 455/458 |
| 2003/0061381 A1 * | 3/2003 | Brisebois et al. ........... | 709/245 |

* cited by examiner

Primary Examiner—Sonny Trinh
Assistant Examiner—Huy Phan
(74) Attorney, Agent, or Firm—McDonnell Boehnen Hulbert & Berghoff LLP

(57) ABSTRACT

A method for discriminating and interworking with a currently established network domain in an international mobile telecommunication-2000 (LMT-2000) system including a mobile station (MS), a radio network and one or more network domains includes the steps of: by the radio network, analyzing information about a network domain that is currently coupled thereto; inserting a network domain discriminator into a synchronous channel message; transmitting the synchronous channel message to the mobile station via a channel for communication; by the mobile station, determining a type of the network domain; and by the mobile station, interworking with the determined network domain via the radio network.

16 Claims, 11 Drawing Sheets

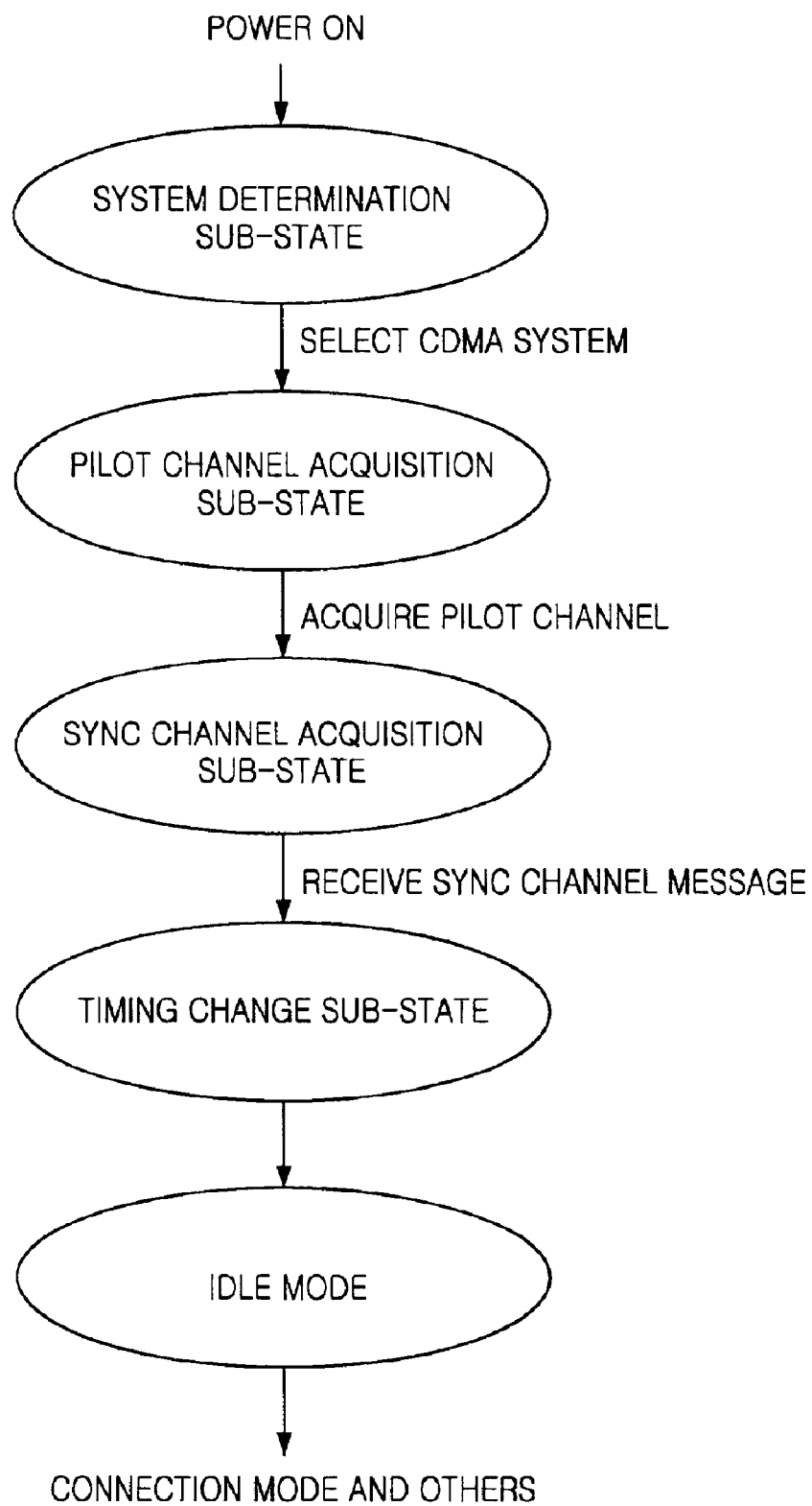

FIG. 6

| |
|---|
| Protocol Revision Level ( 8 bits ) |
| Minimum Protocol Revision Level ( 8 bits ) |
| System Identification ( 15 bits ) |
| Network Identification ( 16 bits ) |
| Pilot PN sequence offset index ( 9 bits ) |
| Long Code State ( 42 bits ) |
| System Time ( 36 bits ) |
| The number of Leap seconds that have occured since the start of System Time ( 8 bits ) |
| Offset of local time from Systme Time ( 6 bits ) |
| Daylight savings time indicator ( 1 bits ) |
| Paging Channel Data Rate ( 2 bits ) |
| Frequency assignment ( 11 bits ) |
| Extended frequency assignment ( 11 bits ) |
| Orthogonal transmit diversity mode ( 2 bits ) |

FIG. 9

| |
|---|
| Network Domain Discriminator ( 2 bit ) |
| Protocol Revision Level ( 8 bits ) |
| Minimum Protocol Revision Level ( 8 bits ) |
| System Identification ( 15 bits ) |
| Network Identification ( 16 bits ) |
| Pilot PN sequence offset index ( 9 bits ) |
| Long Code State ( 42 bits ) |
| System Time ( 36 bits ) |
| The number of Leap seconds that have occured since the start of System Time ( 8 bits ) |
| Offset of local time from Systme Time ( 6 bits ) |
| Daylight savings time indicator ( 1 bits ) |
| Paging Channel Data Rate ( 2 bits ) |
| Frequency assignment ( 11 bits ) |
| Extended frequency assignment ( 11 bits ) |
| Orthogonal transmit diversity mode ( 2 bits ) |

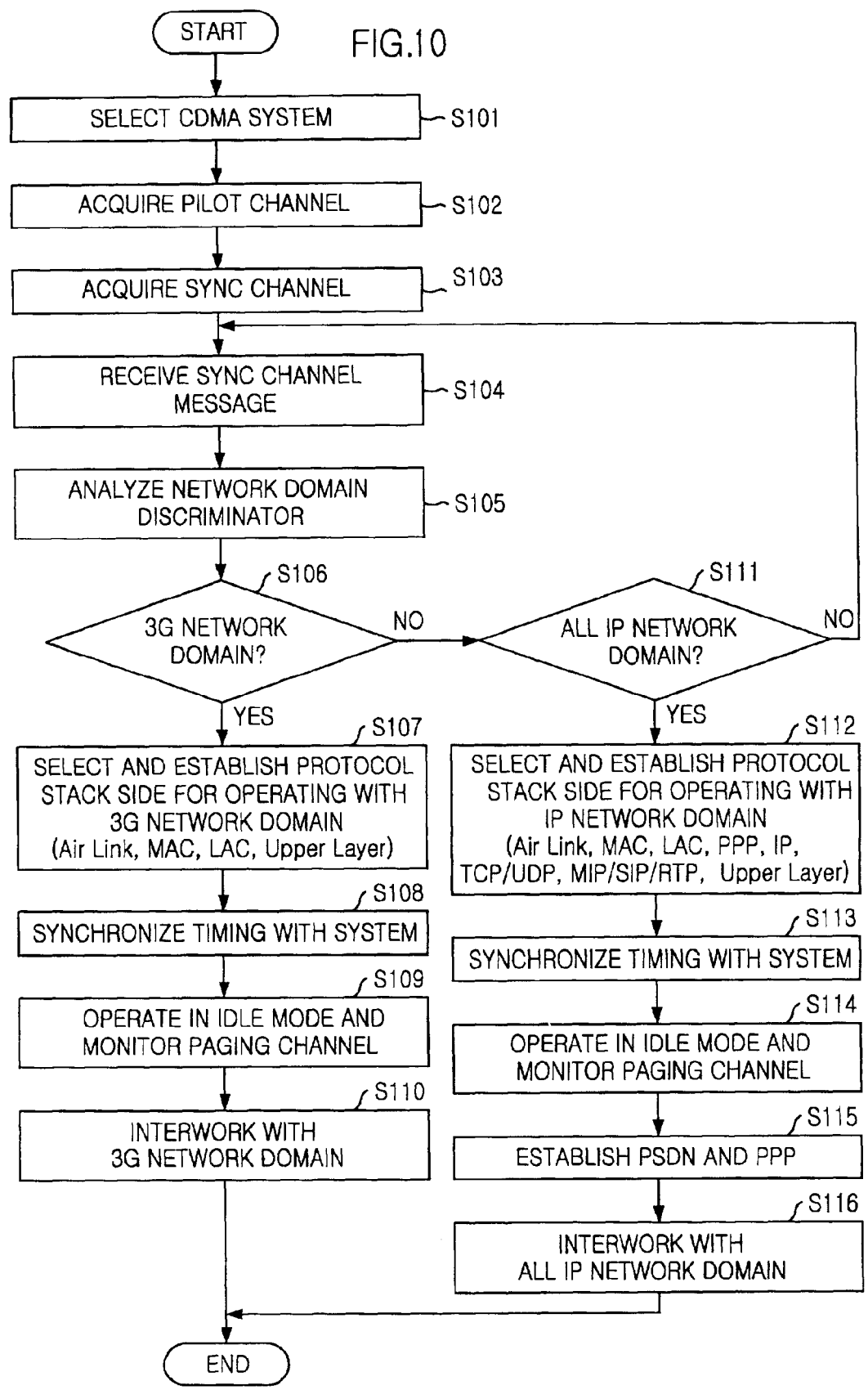

METHOD FOR DISCRIMINATING NETWORK DOMAIN AND INTERWORKING WITH THE SAME IN IMT-2000 SYSTEM

FIELD OF THE INVENTION

This invention relates to an international mobile telecommunication-2000 (IMT-2000) system; and more particularly, to a method for discriminating a network domain and interwoking with the same in an IMT-2000 system.

DESCRIPTION OF THE PRIOR ART

Conventional international mobile telecommunication-2000 (IMT-2000) system can have two types of interworking structure: a first interworking structure of a synchronous mobile station—a synchronous radio network—a synchronous ANSI-41 core network (shown in FIG. 1A); and a second interworking structure of an a synchronous mobile station—an a synchronous radio network—an a synchronous GSM-MAP core network (shown in FIG. 1B).

FIG. 2A shows a protocol stack structure of the above first interworking structure shown in FIG. 1A.

FIG. 2B shows a protocol stack structure of the above second interworking structure shown in FIG. 1B.

In these days, it is proposed to configure whole networks of an IMT-2000 system by using an ALL IP network based on an internet protocol (IP). In this case, packet data transfer can be performed in the network of the IMT-2000 system.

FIG. 3 is an interworking structure of an IMT-2000 ALL IP network.

FIG. 4 shows a protocol stack structure of an IMT-2000 ALL IP network.

An synchronous IMT-2000 system can be embodied to configure an existing 3G (3G=3rd generation) network domain and an ALL IP network domain together. In this case, the mobile station needs to interwork with the 3G network domain and the ALL IP network domain.

In the ALL IP network domain, a whole network of the IMT-2000 system performs communication based on the internet protocol (IP) and moreover, different from in a conventional system, a base transceiver station (BTS) and a core network can perform communication based on the IP. Also, a mobile switching center (MSC) that is included in a conventional core network is sorted by function to be operated.

In the 3G network domain, a whole network of the IMT-2000 system performs communication in an existing way.

FIG. 5 is a flowchart illustrating a procedure where a synchronous mobile station acquires system information through four state transitions.

In case a synchronous mobile station, a synchronous radio network and a 3G network domain including a synchronous ANSI-41 core network interworks together in the conventional synchronous IMT-2000 system, the synchronous mobile station, after power-on, acquires system information according to a procedure shown in FIG. 5. At this time, the synchronous mobile station acquires the system information by performing a procedure including four sub-states. The four sub-states include a system determination sub-state, a pilot channel acquisition sub-state, a sync channel acquisition sub-state and a timing changing sub-state.

A system determination sub-state is a state where a synchronous mobile station selects a code division multiple access (CDMA) system with which it is to communicate. Before power-off, the synchronous mobile station stores a CDMA channel number that it uses at the present time, a CDMA area list, a system identification (SID) list, a network identification (NID) list and other information in a memory thereof.

Thereafter, at power-on, the synchronous mobile station selects a CDMA system with which it can communicate, on the basis of the above information stored in the memory and a CDMA system selection algorithm, which is provided from a terminal manufacturer. After selecting the CDMA system, the synchronous mobile station shifts to a pilot channel acquisition sub-state to acquire a pilot.

The pilot channel acquisition sub-state is a state where the synchronous mobile station obtains a pilot channel and thus selects a base transceiver station. After selecting the CDMA system, the synchronous mobile station acquires a pilot with the same CDMA channel number, or CDMA frequency number, as that corresponding to the selected CDMA system. After acquiring the pilot, the synchronous mobile station shifts to a sync channel acquisition sub-state.

The sync channel acquisition sub-state is a state where the synchronous mobile station acquires information of a system selected through the above pilot channel acquisition and timing information of the selected system. The synchronous mobile station receives a sync channel message from the base transceiver station selected at the above pilot channel acquisition sub-state over a sync channel and obtains the information of the selected system and the system timing information from the received sync channel message. Such a sync channel message is produced by the system and then sent to the synchronous mobile station over the sync channel.

Information elements as shown in FIG. 6 are included in the sync channel message received by the synchronous mobile station, as follows:

Protocol Revision Level: 8 bits,
Minimum Protocol Revision Level: 8 bits,
System Identification: 15 bits,
Network Identification: 16 bits,
Pilot Pseudo Noise (PN) sequence offset index: 9 bits,
Long Code State: 42 bits,
System Time: 36 bits,
The number of Leap seconds that have occurred since the start of System Time: 8 bits,
Offset of local time from System Time: 6 bits,
Daylight savings time indicator: 1 bit,
Paging Channel Data Rate: 2 bits,
Frequency assignment: 11 bits,
Extended frequency assignment: 11 bits, and
Orthogonal transmit diversity mode: 2 bits.

The synchronous mobile station stores the following information elements from the received sync channel message in a memory thereof:

Protocol Revision Level: 8 bits,
Minimum Protocol Revision Level: 8 bits,
System Identification: 15 bits,
Network Identification: 16 bits,
Pilot PN sequence offset index: 9 bits,
Long Code State: 42 bits,
System Time: 36 bits,
Paging Channel Data Rate: 2 bits, and
Orthogonal transmit diversity mode: 2 bits.

After completing the above procedure, the synchronous mobile station shifts to a timing changing sub-state.

The timing changing sub-state is a state where the synchronous mobile station adjusts its timing in synchronization with that of the selected CDMA system.

The synchronous mobile station adjusts its timing in synchronization with that of the selected CDMA system on the basis of the information elements in the sync channel message, received at the above sync channel acquisition sub-state and stored in the memory. After completion of this state, the synchronous mobile station enters an idle mode.

At the idle mode, the synchronous mobile station monitors a paging channel of the selected system. That is to say, at the idle mode, the synchronous mobile station receives messages including a system parameter message, an access channel message, a registration request message or the like that are transmitted over the paging channel.

According to standardization trend in these days, a synchronous IMT-2000 system, as aforementioned, can have following two types of interworking structure.

A first interworking structure is a structure where a synchronous mobile station (MS), a synchronous radio network and an existing 3G (3G=3rd generation) network domain interwork together as shown FIG. 1A.

A second interworking structure is a structure where a synchronous mobile station (MS), a synchronous radio network and an ALL IP network domain interwork together as shown FIG. 3.

In order to be operated in the above all two interworking structures, it is required to change a protocol stack structure of a mobile station, contrary to that of an existing synchronous mobile station used in the conventional synchronous mobile communication system. The existing synchronous mobile station means an existing mobile station that interworks with an existing 3G network domain before employing the ALL IP network.

That is to say, as shown in FIG. 7, a PPP protocol entity for using an internet protocol (IP) needs to be added in a layer 2 of the mobile station and an IP, TCP/UDP and MIP/RTP/SIP protocol entities need to be added in a layer 3 and layers over the layer 3 of the mobile station.

FIG. 8A shows a schematic diagram representing protocol stack structure in a synchronous IMT-2000 system interworking with an existing 3G network domain.

FIG. 8B shows a schematic diagram representing protocol stack structure in a synchronous IMT-2000 system interworking with an ALL IP network domain.

As aforementioned, since the synchronous IMT-2000 system can have two types of interwoking structure, the mobile station needs to acquire information about a network domain currently coupled thereto. The information about the network domain is provided from a synchronous radio network to the mobile station, the information including a network domain type or the like. In this case, this information, after power-on of the mobile station, is to be included in a synchronous channel message via a sync channel as been in the conventional synchronous IMT-2000 system.

The new synchronous channel message in accordance with the present invention meets requirements of an existing synchronous IMT-2000 system standard. However, compared with the existing synchronous channel message, the new synchronous channel message, if necessary, can include the information about the network domain.

In other words, the existing synchronous channel message used in the conventional synchronous IMT-2000 system includes only information that is defined in the sync channel acquisition sub-state of the mobile station, however doesn't include information about a network domain type that is used for discriminating the 3G network domain and the ALL IP network domain. Here, the conventional synchronous IMT-2000 system has an structure where the synchronous mobile station, the synchronous radio network and the existing 3G network domain interwork together.

Without the information about the network domain type, there is caused a problem that the mobile station cannot determine which protocol stack to select and use from protocol stacks thereof (shown in FIG. 7), thereby being unable to interwork with the 3G network domain or the ALL IP network domain.

SUMMARY OF THE INVENTION

It is an object of the present invention to provide a method for discriminating and interworking with a currently established network domain in an international mobile telecommunication-2000 (IMT-2000) system to provide to a subscriber services from both a 3G network domain and an ALL IP network domain together.

In accordance with an aspect of the present invention, there is provided a method for discriminating and interworking with a currently established network domain in an international mobile telecommunication-2000 (IMT-2000) system including a mobile station (MS), a radio network and one ore more network domains, the method including the steps of: by the radio network, analyzing information about a network domain that is currently coupled thereto; inserting a network domain discriminator into a synchronous channel message; transmitting the synchronous channel message to the mobile station via a channel for communication; by the mobile station, determining a type of the network domain; and by the mobile station, interworking with the determined network domain via the radio network.

It is another object of the present invention to provide a method for interworking with a currently established network domain by a mobile station in an international mobile telecommunication-2000 (IMT-2000) system to efficiently recognize a type of the network domain by the mobile station.

In accordance with another aspect of the present invention, there is provided a method for interworking with a currently established network domain by a mobile station in an international mobile telecommunication-2000 (IMT-2000) system including the mobile station (MS), a radio network and one ore more network domains, the method including the steps of: receiving a synchronous channel message from the radio network to the mobile station, the synchronous channel message including a network domain discriminator; determining a type of a network domain based on the network domain discriminator; if the network domain discriminator indicates an ALL IP network domain, establishing corresponding protocol layers; adjusting timing in synchronization with that of a selected CDMA system and monitoring a paging channel; and performing point to point protocol (PPP) connection and interworking with the ALL IP network.

BRIEF DESCRIPTION OF THE DRAWINGS

Other objects and aspects of the invention will become apparent from the following description of the embodiments with reference to the accompanying drawings, in which:

FIG. 5 is a flowchart illustrating a procedure where a synchronous mobile station acquires system information through four state transitions;

FIG. 6 shows a conventional synchronous channel message in a synchronous mobile communication system;

FIG. 9 shows a configuration of a synchronous channel message in accordance with the present invention;

FIG. 10 is a flow chart illustrating a method for interworking between a mobile station and a corresponding network domain by using a network domain discriminator in a synchronous IMT-2000 system in accordance with the present invention.

DETAILED DESCRIPTION OF THE PREFERRED EMBODIMENTS

A synchronous international mobile telecommunication-2000 (IMT-2000) system can be configured in two types of interworking structure.

Figure 1A:
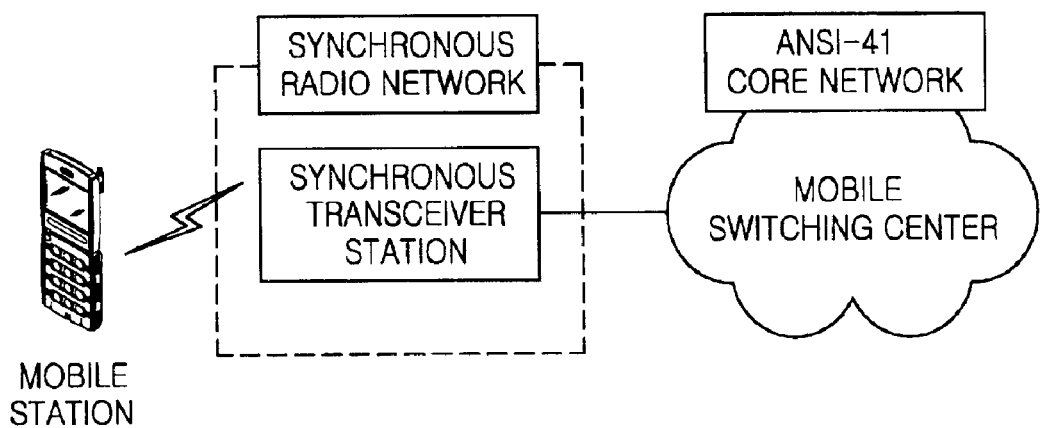
FIG. 1A shows an interworking structure of a synchronous mobile station—a synchronous radio network—a synchronous ANSI-41 core network in a conventional IMT-2000 system.
Figure 1B:
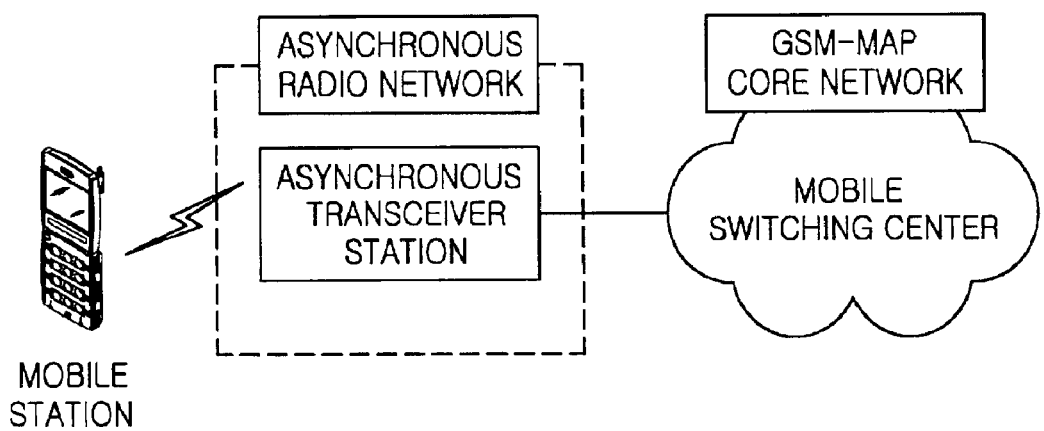
FIG. 1B shows an interworking structure of an a synchronous mobile station—an a synchronous radio network an a synchronous GSM-MAP core network in a conventional IMT-2000 system.
Figure 2A:
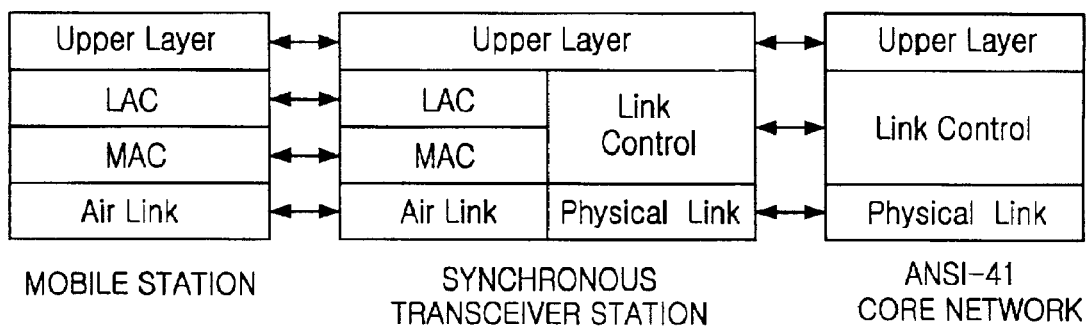
FIG. 2A shows a protocol stack structure of an interworking structure shown in FIG. 1A.
Figure 2B:
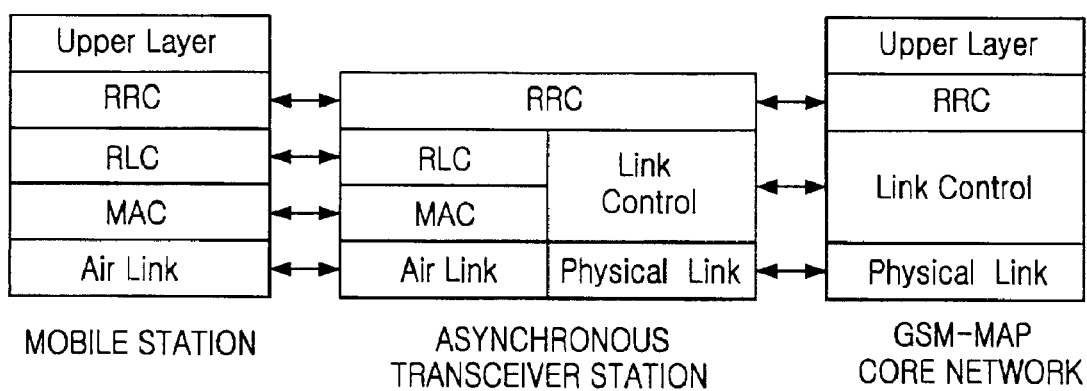
FIG. 2B shows a protocol stack structure of an interworking structure shown in FIG. 1B.
Figure 3:
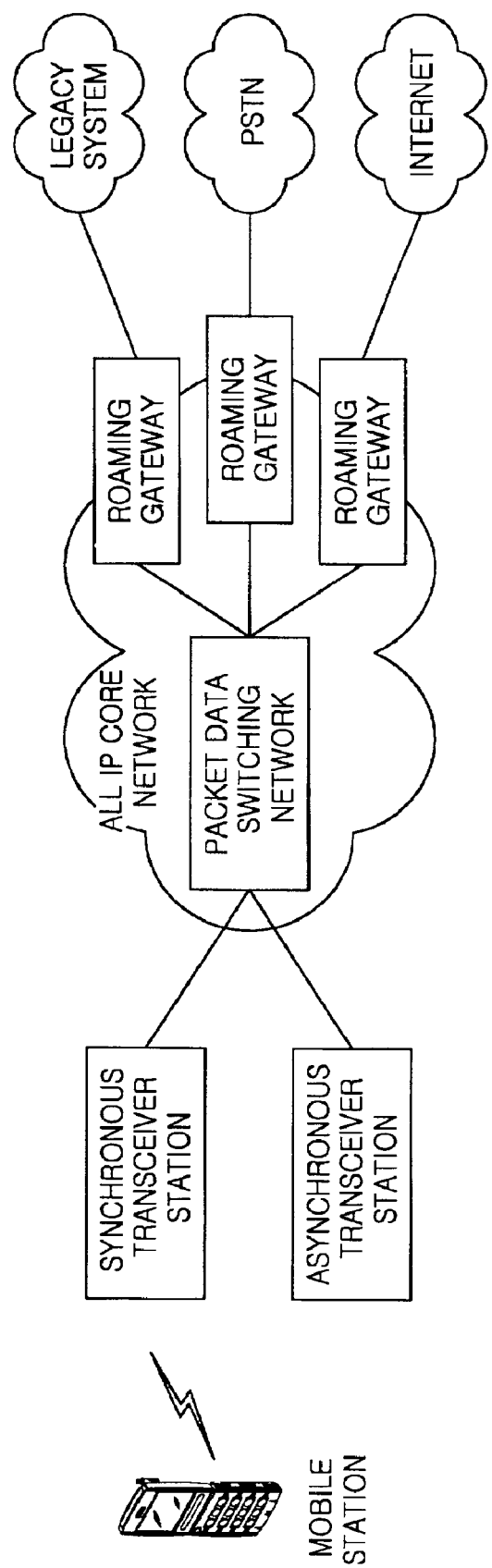
FIG. 3 is an interworking structure of an IMT-2000 ALL IP network.
Figure 4:
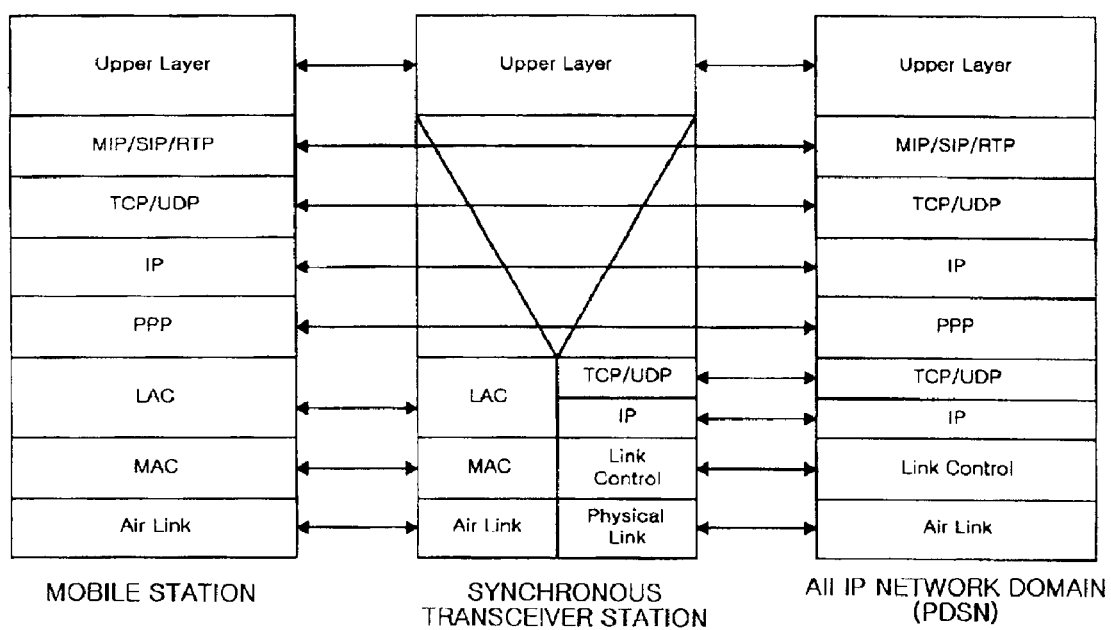
FIG. 4 shows a protocol stack structure of an IMT-2000 ALL IP network.
Figure 7:
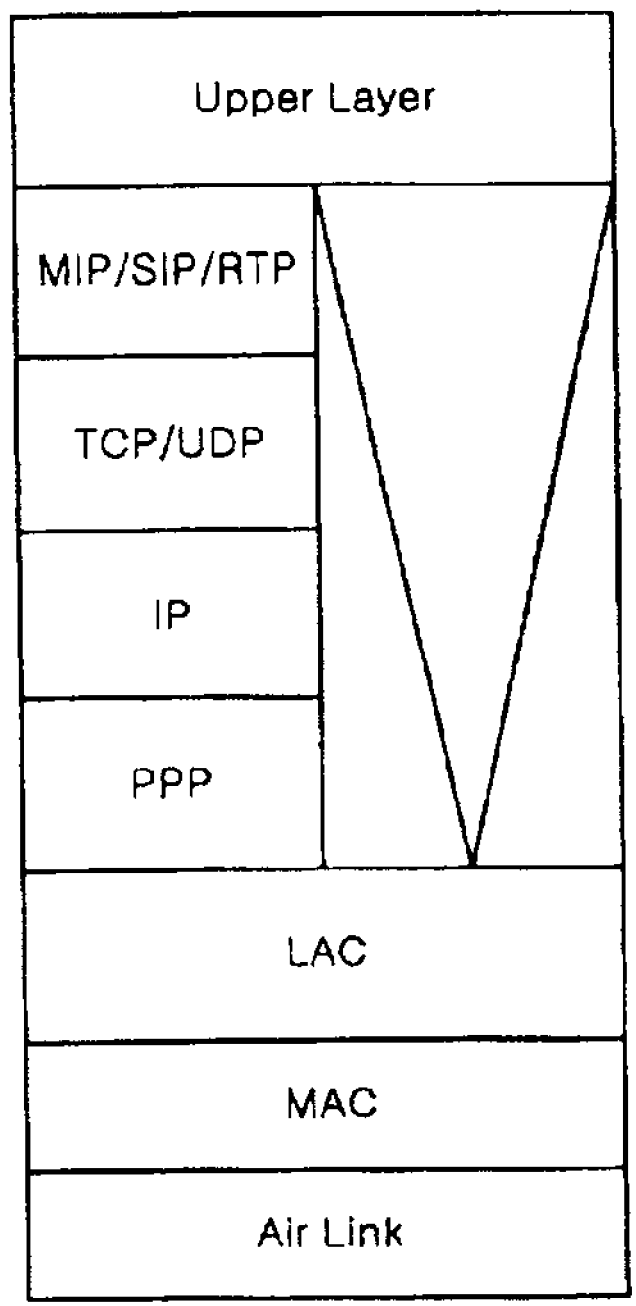
FIG. 7 shows a structure of a protocol stack of a mobile station (MS) that is applied to the present invention.
Figure 8A:
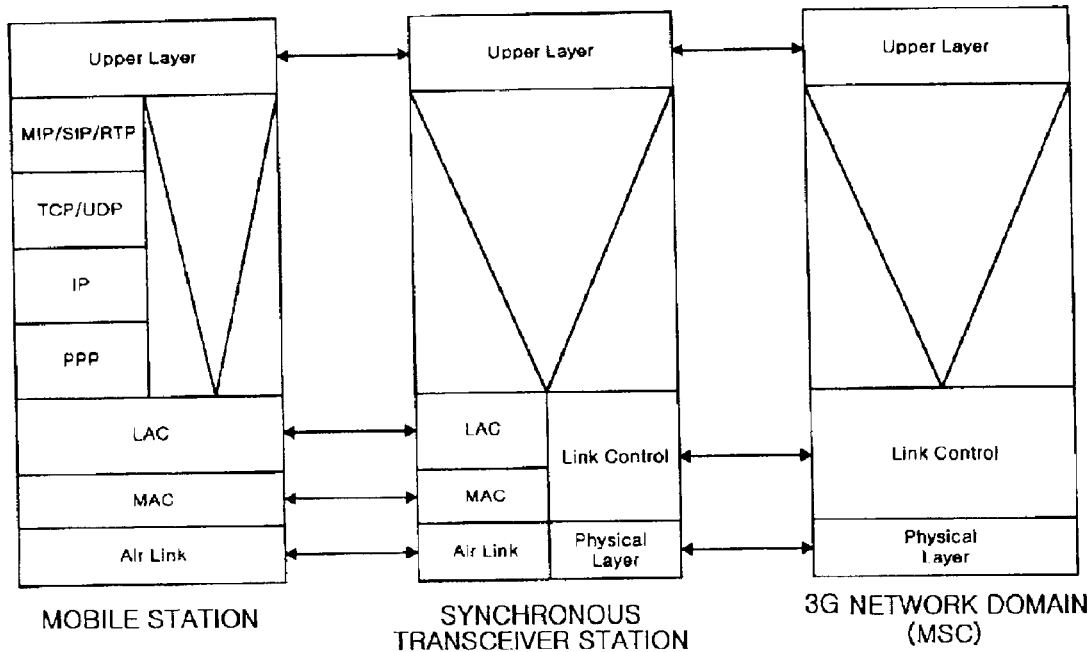
FIG. 8A shows a schematic diagram representing protocol stack structure in a synchronous IMT-2000 system interworking with an existing 3G network domain.
Figure 8B:
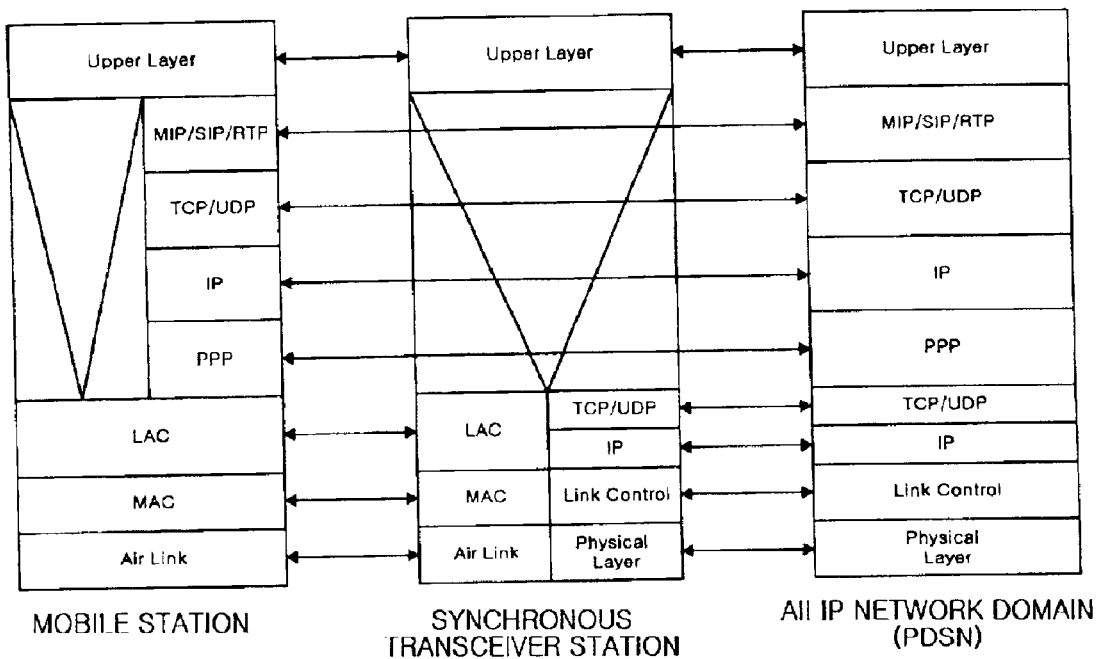
FIG. 8B shows a schematic diagram representing protocol stack structure in a synchronous IMT-2000 system interworking with an ALL IP network domain.

According to a first type of interworking structure, a mobile station (MS) is coupled to a synchronous radio network that is coupled to an existing 3rd generation (3G) network domain. According to a second type of interworking structure, a mobile station (MS) is coupled to a synchronous radio network that is coupled to an ALL IP network domain. A protocol stack of a mobile station (MS) is configured as shown in FIG. 7.

As aforementioned, the present invention provides an interworking structure of a synchronous IMT-2000 system and a configuration of the protocol stack of the mobile station (MS). Which protocol entities of a protocol stack side the mobile station will employ is determined depending on a type of network domain that is coupled to the synchronous radio network.

In other words, protocol entities of the protocol that will be employed by the mobile station (MS), are selected depending on whether the 3rd generation (3G) network or the ALL IP network are coupled to the synchronous radio network. A network domain discriminator is used for discriminating the 3G network and the ALL IP network, which is included in a synchronous channel message. The synchronous channel message is received from a synchronous radio network to the mobile station (MS) via a synchronous channel, at power-on of the mobile station (MS).

In case an international mobile telecommunication-2000 (IMT-2000) system is synchronous, information elements that are included in a new synchronous channel message are as follows (shown in FIG. 9):

Protocol Revision Level (8 bits),
Minimum Protocol Revision Level (8 bits),
System Identification (15 bits),
Network Identification (16 bits),
Pilot PN sequence offset index (9 bits),
Long Code State (42 bits),
System Time (36 bits),
The number of Leaps seconds that have occurred since the start of System Time (8 bits),
Offset of local time from System Time (6 bits),
Daylight savings time indicator (1 bit),
Paging Channel data rate (2 bits),
Frequency assignment (11 bits),
Extended frequency assignment (11 bits),
Orthogonal transmit diversity mode (2 bits) and
Network Domain Discriminator (2 bits).

In this case, ways of acquiring the information elements included in the new synchronous channel message include: a first way of acquiring them from information stored in a read only memory (ROM) or a previously set-up data base (DB), at a system initialization time; and a second way of acquiring by mutually exchanging a signaling message between a system and a core network, at a system initialization time.

The Network Domain Discriminator described above provides information about which network domain is coupled to the synchronous radio network, the 3G network domain or the ALL IP network domain.

For example, if the Network Domain Discriminator indicates "00", it means that the 3G network domain is coupled to the synchronous radio network, if "11", it means that the ALL IP network domain is coupled to the same, if "01" or "10", it means "Reserved".

Also, it is essential that the mobile station (MS) stores following information elements in the new synchronous channel message therein:

Protocol Revision Level (8 bits),
Minimum Protocol Revision Level (8 bits),
System Identification (15 bits),
Network Identification (16 bits),
Pilot PN sequence offset index (9 bits)
Long Code State (42 bits),
System Time (36 bits),
Paging Channel data rate (2 bits),
Orthogonal transmit diversity mode (2 bits) and
Network Domain Discriminator (2 bits).

FIG. 10 is a flow chart illustrating a method for interworking between a mobile station and a corresponding network domain by using a network domain discriminator in a synchronous IMT-2000 system in accordance with the present invention.

At the step S101, at power-on of a mobile station (MS), the mobile station (MS) selects a code division multiple access (CDMA) system by using first information and a first algorithm stored therein. The first information is stored in a memory of the mobile station (MS) and includes a CDMA channel number, a CDMA zone list, a system identity (SID) list, a network identity (NID) list or the like. The first algorithm is specified and provided by a mobile station manufacturer.

At the step S102, the mobile station acquires a pilot channel having the same channel number as that of the selected CDMA system.

At the step S103, the mobile station (MS) acquires a sync channel of a base transceiver station (BTS) that transmits the acquired pilot channel.

At the step S104, the mobile station (MS) receives the sync channel message via the sync channel.

At the step S105, the mobile station (MS) stores the Protocol Revision Level, the System Identification, the Network Identification, the Pilot PN sequence offset, the Long Code State, the System Time, the Paging Channel data rate, the Orthogonal transmit diversity mode, the Network Domain Discriminator or the like among lots of information elements in a memory thereof, wherein lots of information elements are included in the sync channel message. Then, the mobile station (MS) analyzes the information element of the Network Domain Discriminator from the sync channel message.

At the step S106, the mobile station determines if the analyzed Network Domain Discriminator indicates the 3G network domain, and if not, the logic flow proceeds to the step S111, otherwise the logic flow proceeds to the step S107.

If the analyzed Network Domain Discriminator indicates the 3G network domain, at the step S107, the mobile station selects a protocol stack side for operating with the 3G network domain. In this case, the selected protocol stack side selects some protocol layers including an air link layer, a MAC layer, a LAC layer and an Upper layer and initializes the selected protocol layers to interwork with the 3G network domain.

At the step S108, the mobile station (MS) adjusts timing in synchronization with that of the base transceiver station (BTS) of the selected CDMA system by using the sync channel message received via the sync channel.

At the step S109, the mobile station (MS) is operated in an idle mode and monitors a paging channel.

At the step S110, the mobile station (MS) interworks with the 3G network domain.

At the step S111, the mobile station determines if the analyzed Network Domain Discriminator indicates the ALL IP network domain, and if not, the logic flow returns to the step S104, otherwise the logic flow proceeds to the step S112.

If the analyzed Network Domain Discriminator indicates the ALL IP network domain, at the step S112, the mobile station selects a protocol stack side for operating with the ALL IP network domain. In this case, the selected protocol stack side selects some protocol layers including an air link layer, a MAC layer, a PPP layer, an IP layer, a TCP/UDP layer, a MIP/SIP/RTP layer and an Upper layer and initializes the selected protocol layers to interwork with the ALL IP network domain.

At the step S113, the mobile station (MS) adjusts timing in synchronization with that of the base transceiver station (BTS) of the selected CDMA system by using the sync channel message received via the sync channel.

At the step S114, the mobile station (MS) is operated in the idle mode and monitors the paging channel.

At the step S115, the mobile station (MS) performs PPP connection to interwork with the ALL IP network domain.

At the step S116, the mobile station (MS) interworks with the ALL IP network domain.

Figure 11:
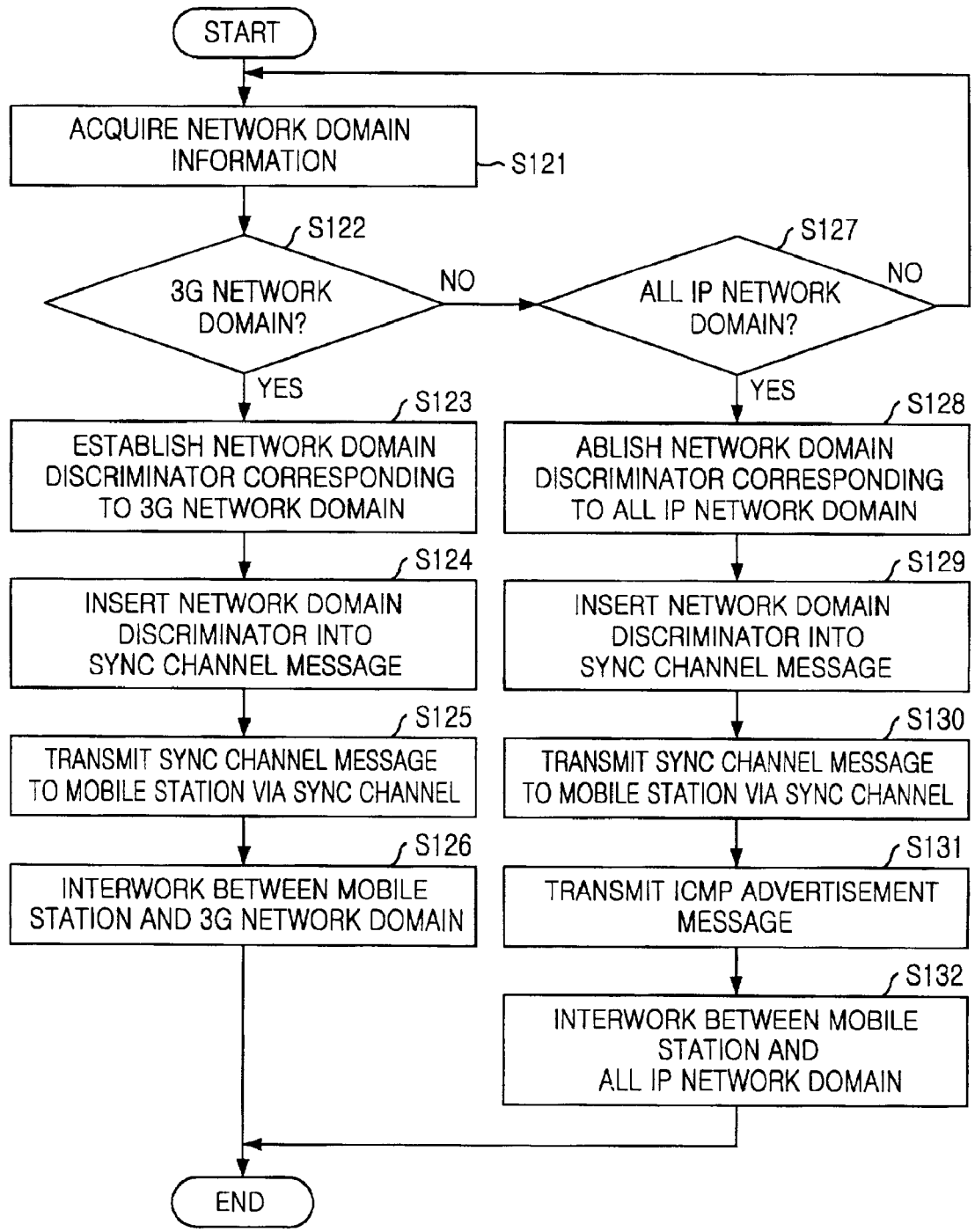
FIG. 11 is a flow chart illustrating a method for transmitting network domain discriminator information and network domain-related information from a synchronous base transceiver station (BTS) to a mobile station (MS) in an IMT-2000 system in accordance with the present invention.

FIG. 11 is a flow chart illustrating a method for transmitting network domain discriminator information and network domain-related information from a synchronous base transceiver station (BTS) to a mobile station (MS) in an IMT-2000 system in accordance with the present invention.

At the step S121, a synchronous base transceiver station (BTS) acquires network domain information about a network domain currently coupled thereto. In this case, the synchronous BTS acquires the network domain information by using data stored in a dip switch or a read only memory (ROM) by operator's management or by exchanging an operation and maintenance message with the network domain.

At the step S122, the synchronous BTS determines if the network domain information indicates a 3G network domain, and if not, the logic flow proceeds to the step S127, otherwise the logic flow proceeds to the step S123.

If the network domain information indicates the 3G network domain, at the step S123, the synchronous BTS establishes a network domain discriminator with the network domain information.

At the step S124, the synchronous BTS inserts the established network domain discriminator into a predetermined position of the sync channel message.

At the step S125, the synchronous BTS transmits periodically the sync channel message to the mobile station (MS) via the sync channel.

At the step S126, the synchronous BTS interworks with the mobile station (MS) and the 3G network domain.

At the step S127, the synchronous BTS determines if the network domain information indicates an ALL IP network domain, and if not, the logic flow returns to the step S121, otherwise the logic flow proceeds to the step S128.

If the network domain information indicates the ALL IP network domain, at the step S128, the synchronous BTS establishes a network domain discriminator with the network domain information.

At the step S129, the synchronous BTS inserts the established network domain discriminator into a predetermined position of the sync channel message.

At the step S130, the synchronous BTS transmits periodically the sync channel message to the mobile station (MS) via the sync channel.

At the step S131, the synchronous BTS transmits an ICMP advertisement message to the mobile station (MS) to communicate with the mobile station (MS). The ICMP advertisement message includes an IP address of the synchronous BTS to inform the mobile station (MS) of.

At the step S132, the synchronous BTS interworks with the mobile station (MS) and the ALL IP network domain.

As can be seen from above, a synchronous IMT-2000 system can be configured for a 3G network domain and an ALL IP network domain together as well as anyone of the 3G network domain and the ALL IP network domain.

In accordance with the present invention, the mobile station can efficiently identify a type of a network domain coupled to a synchronous radio network by adding one or more new information elements in an existing sync channel message for a synchronous mobile communication system.

Also, the present invention provides an effect that when a subscriber of a system for the 3G network domain moves to an area covered by a system for the ALL IP network domain, the subscriber can receive a service provided by the system for the ALL IP network domain, and vice versa.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for discriminating and interworking with a currently established network domain in an international mobile telecommunication-2000 (IMT-2000) system including a mobile station (MS), a radio network and one or more network domains, the method comprising the steps of:
   a) by the radio network, analyzing information about a network domain that is currently coupled thereto;
   b) inserting a network domain discriminator into a synchronous channel message;
   c) transmitting the synchronous channel message to the mobile station via a channel for communication;
   d) by mobile station, determining a type of the network domain; and
   e) by the mobile station, interworking with the determined network domain via the radio network.

2. The method as recited in claim 1, wherein the channel is a synchronous channel.

3. The method as recited in claim 2, wherein the network domains include a 3G (3G =$3^{rd}$ generation) network domain or an ALL IP (IP=internet protocol) network domain, wherein the ALL IP network domain is based on an internet protocol.

4. The method as recited in claim 3, wherein the radio network acquires the information about the network domain coupled thereto by using data stored in a dip switch or a ROM (ROM=read only memory) or by exchanging an operation and maintenance message with one or m ore network domains, wherein the dip switch or the ROM are managed by an operation of a synchronous base transceiver station (BTS).

5. The method as recited in claim 4, wherein the step b) includes the steps of:
   b1) if the information about the network domain represents the ALL IP network domain as a result of the analysis, setting up the network discriminator as the ALL IP network domain; and
   b2) inserting the network domain discriminator into a predetermined position of the a synchronous channel message.

6. The method as recited in claim 5, wherein the step c) includes the steps of:
   c1) if the network domain discriminator indicates the ALL IP network, transmitting the synchronous channel message to the mobile station periodically via the synchronous channel; and
   c2) transmitting an IP address of a synchronous base transceiver station to the mobile station.

7. The method as recited in claim 6, wherein the IP address of the synchronous base receiver station is transmitted via an TCMP advertisement message.

8. The method as recited in claim 7, wherein determining the type of the network domain is performed based on the network domain discriminator.

9. A method for interworking with a currently established network domain by a mobile station in an international mobile telecommunication-2000 (IMT-2000) system including the mobile station (MS), a radio network and one or more network domains, the method comprising the steps of:
   a) receiving a synchronous channel message from the radio network to the mobile station, the synchronous channel message including a network domain discriminator;
   b) determining a type of a network domain based on the network domain discriminator;
   c) if the network domain discriminator indicates an ALL IP network domain, establishing corresponding protocol layers;
   d) adjusting timing in synchronization with that of a selected CDMA system and monitoring a paging channel; and
   e) performing point to point protocol (PPP) connection and interworking with the ALL IP network.

10. The method as recited in claim 9, wherein the step c) includes the steps of:
    c1) selecting a protocol stack side for operating with the ALL IP network domain;
    c2) by the protocol stack side, selecting the corresponding protocol layers; and
    c3) initializing the selected protocol layer to interwork with the ALL IP network domain.

11. The method as recited in claim 10, wherein the corresponding protocol layers includes an Air link layer, a MAC layer, a LAC layer, a PPP layer, a TCP/UDP layer, and MIP/SIP/RTP layer and an Upper layer.

12. Computer-readable record media sorting instructions for performing a method for discriminating and interworking with a currently established network domain in an international mobile telecommunication-2000 (IMT-2000) system including a mobile station (MS), a radio network or one or more network domains, the method comprising the steps of:
    a) by the radio network, analyzing information about a network domain that is currently coupled thereto;
    b) inserting a network domain discriminator into a synchronous channel message;
    c) transmitting the synchronous channel message to the mobile station via a channel for communication;
    d) by the mobile station, determining a type of the network domain; and
    e) by the mobile station, interworking with the determined network domain via the radio network.

13. The computer-readable record media as recited in claim 12, wherein the step b) includes the steps of:
    b1) if the information about the network domain represents the ALL IP network domain as a result of the analysis, setting up the network discriminator as the ALL IP network domain; and
    b2) inserting the network domain discriminator into a predetermined position of the synchronous channel message.

14. The computer-readable record media as recited in claim 13, wherein the step c) includes the steps of:
    c1) if the network domain discriminator indicates the ALL IP network, transmitting the synchronous channel message to the mobile station periodically via the synchronous channel; and
    c2) transmitting an IP address of an synchronous bas transceiver station to the mobile station.

15. Computer-readable record media storing instructions for performing a method for interworking with a currently established network domain by a mobile station in an international mobile telecommunication-2000 (IMT-2000) system including the mobile station (MS), a radio network and one or more network domains, the method comprising the steps of:

a) receiving a synchronous channel message from the radio network to the mobile station, the synchronous channel message including a network domain discriminator;

b) determining a type of a network domain based on the network domain discriminator;

c) if the network domain discriminator indicates an ALL IP network domain, establishing corresponding protocol layers;

d) adjusting timing in synchronization with that of a selected CDMA system and monitoring a paging channel; and e) performing point to point protocol (PPP) connection and interworking with the ALL IP network.

16. The computer-readable record media as recited in claim 15, wherein the step c) includes the steps of:

c1) selecting a protocol stack side for operating with the ALL IP network domain;

c2) by the protocol stack side, selecting the corresponding protocol layers; and c3) initializing the selected protocol layer to interwork with the ALL IP network domain.

* * * * *